(12) United States Patent
Huang

(10) Patent No.: US 7,089,041 B2
(45) Date of Patent: Aug. 8, 2006

(54) METHOD FOR MANAGING INCOMING CALLS ON A MOBILE PHONE

(75) Inventor: Yi-Hsiang Huang, Tao-Yuan Hsien (TW)

(73) Assignee: BenQ Corporation, Tao-Yuan Hsien (TW)

( * ) Notice: Subject to any disclaimer, the term of this patent is extended or adjusted under 35 U.S.C. 154(b) by 6 days.

(21) Appl. No.: 10/709,892

(22) Filed: Jun. 4, 2004

(65) Prior Publication Data
US 2004/0253992 A1    Dec. 16, 2004

(30) Foreign Application Priority Data
Jun. 11, 2003    (TW) .............................. 92115910 A

(51) Int. Cl.
*H04B 1/38* (2006.01)
(52) U.S. Cl. ..................... 455/567; 455/401
(58) Field of Classification Search ............ 455/412.1, 455/414.1, 567, 550.1, 63.1, 67.11, 422.1, 455/423, 401; 379/373.01, 373.02, 373.04, 379/374.01, 374.02
See application file for complete search history.

(56) References Cited

U.S. PATENT DOCUMENTS

| | | | | |
|---|---|---|---|---|
| 5,764,751 A * | 6/1998 | Konishi | .................. | 379/373.02 |
| 5,870,684 A * | 2/1999 | Hoashi et al. | ............... | 455/567 |
| 6,006,114 A | 12/1999 | Seppanen et al. | | |
| 6,134,455 A * | 10/2000 | Corkum | ....................... | 455/567 |
| 6,343,212 B1 * | 1/2002 | Weber et al. | ............. | 455/404.1 |
| 6,363,265 B1 * | 3/2002 | Ritter | ......................... | 455/567 |
| 6,463,278 B1 * | 10/2002 | Kraft et al. | .................. | 455/418 |
| 6,895,237 B1 * | 5/2005 | Scott | ........................ | 455/414.1 |
| 6,954,657 B1 * | 10/2005 | Bork et al. | .................. | 455/567 |
| 6,993,364 B1 * | 1/2006 | Sierawski et al. | .......... | 455/567 |
| 2002/0198004 A1 * | 12/2002 | Heie et al. | ................... | 455/456 |
| 2003/0013495 A1 * | 1/2003 | Oleksy | ......................... | 455/567 |
| 2003/0054866 A1 * | 3/2003 | Byers et al. | ................. | 455/567 |
| 2004/0127198 A1 * | 7/2004 | Roskind et al. | ........... | 455/412.2 |
| 2004/0203768 A1 * | 10/2004 | Ylitalo et al. | ............. | 455/435.1 |

* cited by examiner

*Primary Examiner*—Sonny Trinh
(74) *Attorney, Agent, or Firm*—Winston Hsu

(57) ABSTRACT

The present invention provides a method for managing incoming calls of a mobile phone. The mobile phone includes a control circuit and a volume detector. The method includes (a) receiving a call signal by the mobile phone, (b) detecting environmental volume surrounding the mobile phone with the volume detector, and (c) executing a first managing process with the control circuit when the detected surrounding volume exceeds a predetermined value, or executing a second managing process with the control circuit when the detected surrounding volume does not exceed the predetermined value.

8 Claims, 2 Drawing Sheets

METHOD FOR MANAGING INCOMING CALLS ON A MOBILE PHONE

BACKGROUND OF INVENTION

1. Field of the Invention

The present invention relates to a method for managing incoming calls on a mobile phone, and more specifically, to a method for managing incoming calls on a mobile phone using a volume detector to detect volume of the surrounding environment and a control circuit to execute incoming calls according to the detected volume.

2. Description of the Prior Art

In modern information-oriented society where communication systems are highly developed, compact-sized mobile phones are broadly utilized for communications between people in daily life. People can exchange information, share experiences, and communicate with each other at anytime at any place with mobile phones. Thus, it is a trend to develop a faster and easier manner of mobile phone operation.

Incoming call alerts for a typical mobile phone can be divided into two categories. The first category is, when a call comes in, a ringing tone is played and the mobile phone is switched to a calling mode. The second category is, when a call comes in, a vibrator is activated and the mobile phone is switched to the calling mode. Some mobile phones integrate the first and the second alerts so that when a call comes in, the mobile phone plays the ringing tone and activates the vibrator at the same time. However, either the volume of the ringing tone or the activation of the vibrator is required to be set up in advance.

Mobile phones have become a necessity of daily life. However, missing calls happens very often in general. According to general experiences, calls are missed mostly because of unawareness of the ringing tone or the vibration, in order to receive each call precisely, users always turn the volume or the vibration to the maximum to ensure their calls can be precisely received. However, the maximum volume might be an unpleasant annoyance to nearby people.

SUMMARY OF INVENTION

It is therefore a primary objective of the present invention to provide a method for managing incoming calls of a mobile phone using a volume detector to detect surrounding environmental volume, in order to reduce missed calls for users and solve the problems mentioned above.

Briefly summarized, the present invention provides a method for managing incoming calls of a mobile phone. The mobile phone includes a control circuit and a volume detector. The method includes (a) receiving a call signal with the mobile phone, (b) detecting environmental volume surrounding the mobile phone with the volume detector, and (c) executing a first managing process with the control circuit when the detected surrounding volume does not exceed a predetermined value, or executing a second managing process with the control circuit when the detected surrounding volume exceeds the predetermined value.

These and other objectives of the present invention will no doubt become obvious to those of ordinary skill in the art after reading the following detailed description of the preferred embodiment that is illustrated in the various figures and drawings.

DETAILED DESCRIPTION

A mobile phone according to the present invention utilizes a conventional circuit to play a ringing tone with a speaker and counts time with a timer when a call comes in. When the counted time exceeds a predetermined time and the call is not received within the predetermined time, the mobile phone uses a volume detector to detect volume of the surrounding environment. If the detected volume exceeds a predetermined value, the mobile phone will automatically change to another mode to alert a user of an incoming call in order to reduce missed calls.

Figure 1:
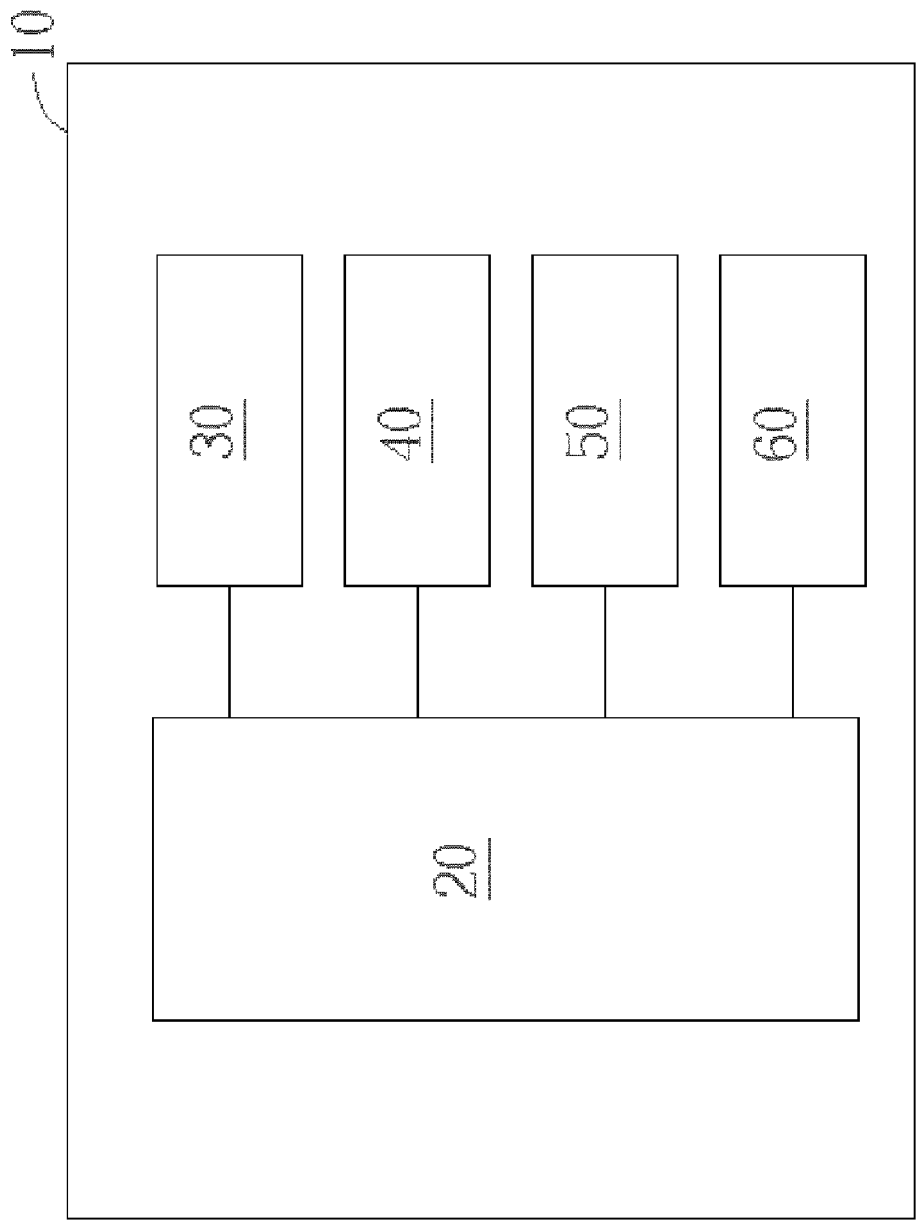
FIG. 1 is a block diagram of a mobile phone according to the present invention.

Please refer to FIG. 1 showing a block diagram of a mobile phone 10 according to the present invention. The mobile phone 10 includes a control circuit 20, a speaker 30, a timer 40, a receive button 50, and a volume detector 60. The control circuit 20 is electrically connected to the speaker 30, the timer 40, the receive button 50, and the volume detector 60. The speaker 30 is used for playing a ringing tone as an incoming call alert for the mobile phone 10. The timer 40 is used for counting the calling time. The receive button 50 is for receiving calls.

When a call comes in, the control circuit 20 controls the speaker 30 to play the ringing tone and activates the timer 40 to count time. When the counted time exceeds a predetermined time and the receive button 50 has not been pressed, the volume detector 60 detects volume of the surrounding environment. If the volume exceeds a predetermined value, a first procedure is executed. If the volume does not exceed the predetermined value, a second procedure is executed.

Figure 2:
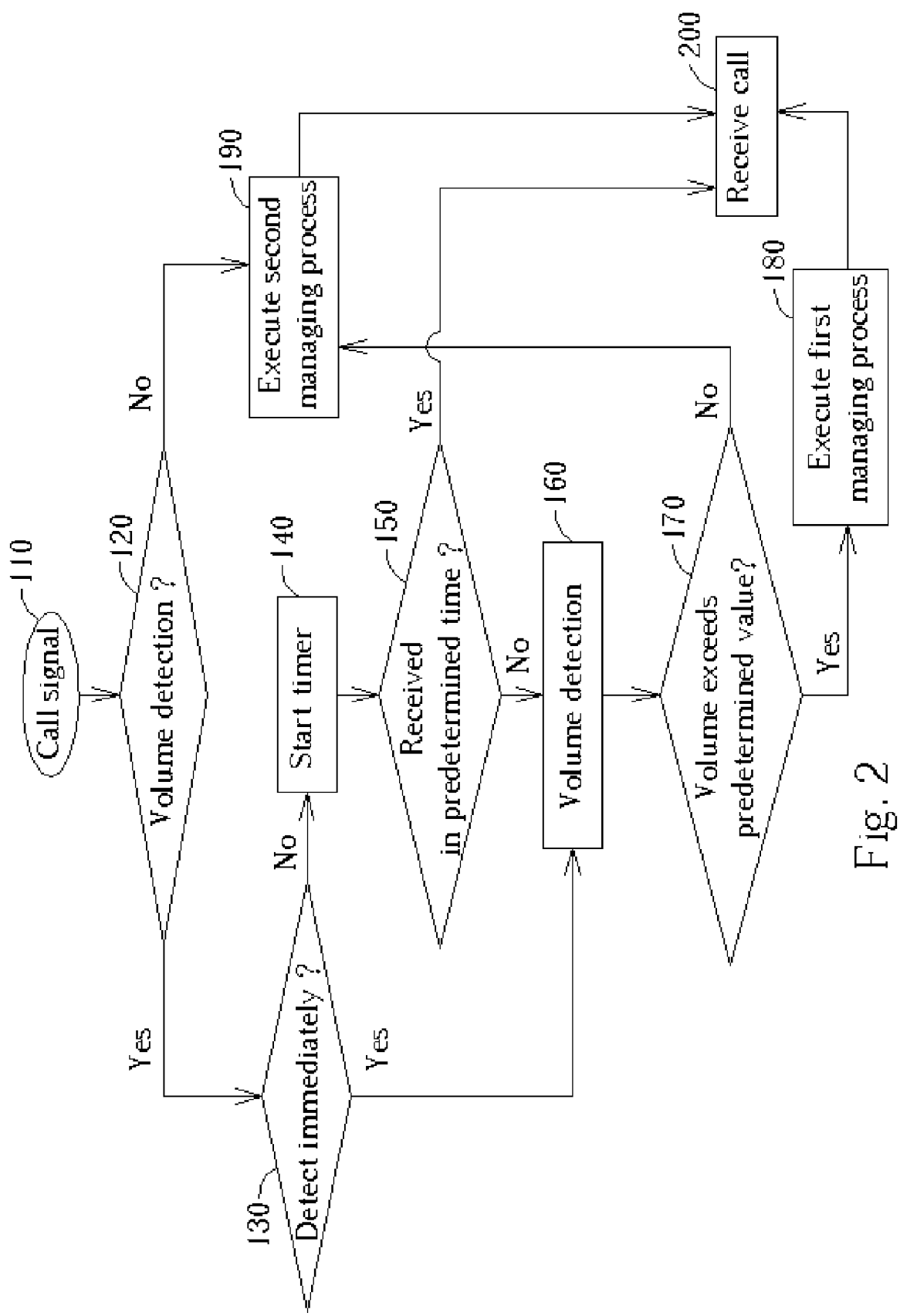
FIG. 2 is a flowchart of a method for managing incoming calls on the mobile phone according to the present invention.

Please refer to FIG. 2 showing a flowchart of a method for managing incoming calls on the mobile phone 10 according to the present invention:

Step 110: The mobile phone 10 receives a call signal with the control circuit 20.

Step 120: Determine whether to detect the surrounding volume or not according to the settings of the mobile phone 10. If yes, proceed to Step 130, if no, proceed to Step 190.

Step 130: Determine whether to detect surrounding volume immediately. If yes, proceed to Step 160, if no, proceed to Step 140. The detection is according to the settings of the mobile phone 10 set up by the user.

Step 140: Activate the timer and set up a predetermined time T1. Under this condition, the mobile phone 10 can operate as a conventional mobile phone to alert the user of an incoming call through use of the speaker 30 or vibration. The predetermined time T1 can be fixed or set up by the user.

Step 150: During the predetermined time T1 passes, judge whether the receive button has been pressed. If yes, proceed to Step 200, if no, proceed to Step 160.

Step 160: The volume detector detects surrounding volume.

Step 170: See whether the detected surrounding volume exceeds a predetermined value. If yes, proceed to Step 180, if no, proceed to Step 190. The predetermined value can be fixed or set up by the user.

Step 180: Execute a first managing process with the control circuit. The first managing process is to alert the user to the incoming call in another manner, such as increasing the ringing volume or vibration, or playing a voice message. Proceed to Step 200.

Step 190: Execute a second managing process with the control circuit. The second managing process is to alert the user to the incoming call in a predetermined manner of the mobile phone 10, such as ringing the ringing tone or vibrating the housing of the mobile phone 10. Proceed to Step 200.

Step 200: Receive the incoming call.

In the preferred embodiment of the present invention, the surrounding volume detection of the mobile phone 10 can be set up according to the requirements of users to start up the detection (Step 160) as soon as the call signal is received (Step 110), or after the predetermined time T1 (Step 140, Step 150). The volume detector 60 can detect surrounding volume through a microphone for the mobile phone 10. When the predetermined time T1 passes and the receive button 50 has not been pressed, the control circuit 20 turns off the speaker 30 or vibration so that the volume detector 60 can detect the surrounding volume.

The second managing process according to the present invention refers to a predetermined manner for alerting a user of an incoming call, such as ringing the tone or vibrating the mobile phone 10, which is set up by the user. The first managing process includes vibrating the mobile phone 10, increasing the volume, changing the ringing tone, or playing a voice message and can be determined separately according to the requirements of the user.

According to the method shown in FIG. 2, when the control circuit 20 of the mobile phone 10 in FIG. 1 receives a call signal, the mobile phone 10 will judge whether surrounding volume detection is being executed. If not, an incoming call alert similar to that of the prior art (ringing or vibration) will be executed. If surrounding volume detection is being executed, the mobile phone 10 judges whether to begin surrounding volume detection immediately. If yes, the detection will be executed immediately, and if not, the timer starts to count time. After the predetermined time T1 passes and the call has not been received (the user may not hear the alert due to surrounding environmental volume), volume detection is executed.

If the result of volume detection does not exceed the predetermined value, the surrounding volume is not too high for the user to notice the incoming call, and the mobile phone 10 executes the second managing process, which is to proceed like a conventional incoming call alert as in the prior art. However, if the result of volume detection exceeds the predetermined value, the surrounding volume may be too high for the user to notice the incoming call. Then the mobile phone 10 executes the first managing process such as vibrating the mobile phone 10 while ringing the tone, or increasing the ringing tone gradually until the user notices and receives the call. Moreover, a voice message such as "It is noisy here. It is inconvenient for me to talk to you right now", can be delivered to the caller in the first managing process.

In contrast to the prior art, the present invention provides a method for managing incoming calls using a volume detector to detect surrounding volume. This method is able to reduce miss calls for users.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for managing incoming calls of a mobile phone, the mobile phone comprising a control circuit and a volume detector, the method comprising:
   receiving a call signal with the mobile phone;
   starting a timer to measure a predetermined period of time when the call signal is received;
   detecting environmental volume surrounding the mobile phone with the volume detector after the predetermined period of time has elapsed;
   executing a first managing process with the control circuit when the detected surrounding volume exceeds a predetermined value, or executing a second managing process with the control circuit when the detected surrounding volume does not exceed the predetermined value.

2. The method of claim 1 wherein the first managing process comprises vibrating the mobile phone.

3. The method of claim 1 wherein the mobile phone comprises a speaker and the first managing process comprises playing a ringing tone.

4. The method of claim 1 wherein the second managing process comprises vibrating the mobile phone.

5. The method of claim 1 wherein the first managing process comprises increasing the volume of a ringing tone.

6. The method of claim 1 wherein the first managing process comprises sending a voice message.

7. The method of claim 1 wherein the mobile phone comprises a microphone and the volume detector detecting the surrounding volume through the microphone.

8. A mobile phone for implementing the method of claim 1.

* * * * *